(12) United States Patent
Marshall

(10) Patent No.: US 6,183,328 B1
(45) Date of Patent: Feb. 6, 2001

(54) RADIO BEACON THAT USES A LIGHT EMITTER AS AN ANTENNA

(75) Inventor: Anthony David Marshall, Beverley (GB)

(73) Assignee: Sea Marshall Rescue Systems, Ltd. (USA), New York, NY (US)

(*) Notice: Under 35 U.S.C. 154(b), the term of this patent shall be extended for 0 days.

(21) Appl. No.: 09/225,987

(22) Filed: Jan. 5, 1999

(51) Int. Cl.⁷ .................................................. B63C 9/08
(52) U.S. Cl. .................................................... 441/89
(58) Field of Search ........................... 441/11–18, 36, 441/89; 428/690; 313/511

(56) References Cited

U.S. PATENT DOCUMENTS

| | | | |
|---|---|---|---|
| 2,473,981 | 6/1949 | Wood | 240/8.1 |
| 2,644,113 | 6/1953 | Etzkorn | 315/228 |
| 2,905,863 | 9/1959 | Martin et al. | 315/183 |
| 3,108,277 | 10/1963 | Thomas | 343/721 |
| 3,153,745 | 10/1964 | Gurian et al. | 315/206 |
| 3,506,956 | 4/1970 | Kolm et al. | 340/15 |
| 3,721,950 | 3/1973 | Jorgensen et al. | 340/3 |
| 4,039,894 | 8/1977 | Gardner, III | 315/76 |
| 4,100,547 | 7/1978 | Cooke | 343/721 |
| 4,247,858 | 1/1981 | Eichweber | 343/729 |
| 4,549,169 | 10/1985 | Moura et al. | 340/539 |
| 4,714,914 | 12/1987 | Boe | 340/573 |
| 4,989,013 | 1/1991 | Smith, II et al. | 343/721 |
| 5,007,105 | 4/1991 | Kudoh et al. | 455/344 |
| 5,024,447 | 6/1991 | Jude | 273/416 |
| 5,029,293 | 7/1991 | Fontanille | 340/573 |
| 5,034,847 | 7/1991 | Brain | 362/205 |
| 5,412,544 | 5/1995 | Derrick et al. | 362/84 |
| 5,485,355 | 1/1996 | Voskoboinik et al. | 362/84 |
| 5,619,187 | 4/1997 | Serfontein | 340/573 |
| 5,661,471 | 8/1997 | Kotlicki | 340/825 |
| 5,876,863 | * 3/1999 | Feldman et al. | 428/690 |

FOREIGN PATENT DOCUMENTS

| | | | |
|---|---|---|---|
| 1287909 | 8/1991 | (CA) | G02S/1/70 |
| 0 166 534 A1 | 1/1986 | (EP) | F21L/11/00 |
| 2604046 | 3/1988 | (FR) | H04B/1/04 |
| 1073879 | 6/1967 | (GB) | H05B/33/12 |
| 2 282 441 | 4/1995 | (GB) | F21L/1/00 |
| 2 201 550 | 9/1998 | (GB) | H01Q/1/06 |
| WO 93/14971 | 8/1993 | (WO) | B63C/9/20 |

* cited by examiner

*Primary Examiner*—Ed Swinehart
(74) *Attorney, Agent, or Firm*—Fish & Neave; Matthew T. Byrne

(57) ABSTRACT

Emitters for locating an item or person who as in some way become separated from their expected location are provided. The emitters of the present invention comprise a power source, a light emitting means, and a radiowave emitting means, the light emitting means comprising a first and second electrode, a dielectric material and an electroluminescent material being provided between the first and second electrodes, the radiowave emitting means comprising an antenna. The antenna may comprise the first and/or second electrode. The emitter may be a separate unit or may be part of or attached to an item such as a survival suit, a waterproof suit, a wet suit, a dry suit, a diving suit, a coat, a waterproof coat, a harness, a buoyancy item or aid, a life jacket, a life raft, a lifeboat, a floatation aid, a life belt, etc.

18 Claims, 1 Drawing Sheet

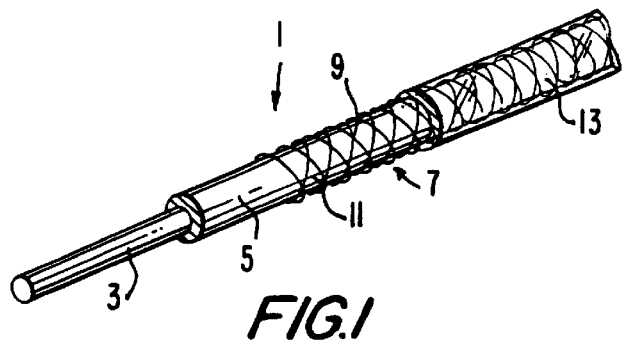
FIG.1
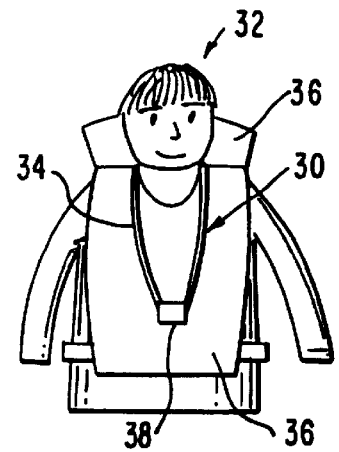
FIG.3
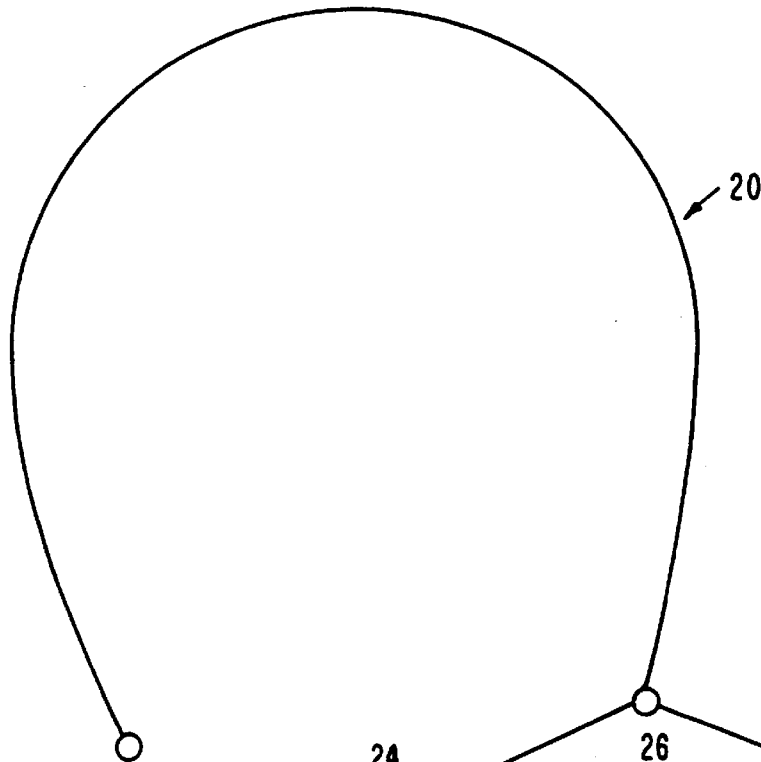
FIG.2
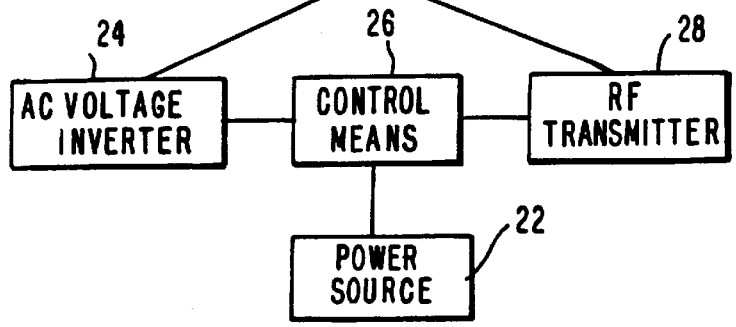

RADIO BEACON THAT USES A LIGHT EMITTER AS AN ANTENNA

BACKGROUND OF THE INVENTION

This invention concerns improvements in and relating to emitters, particularly, but not exclusively, to emitters for indicating their position to a remote location.

In many cases it is desirable to locate an item or person who has in some way become separated from their expected location. For instance, it is desirable to be able to locate a person separated from a sea-going vessel when that vessel sinks or the person is swept overboard. Other applications may include detecting a person lost in a remote location on land and/or a piece of equipment for which remote detection is desirable.

The present invention aims to provide a more readily detectable emitter which is highly portable, reliable and suitable for continuous use without interfering with every day activities.

SUMMARY OF THE INVENTION

According to a first aspect of the invention we provide an emitter comprising a power source, light emitting means and radiowave emitting means, the light emitting means comprising a first and second electrode, a dielectric material and an electroluminescent material being provided between the first and second electrodes, the radiowave emitting means comprising an antenna.

Preferably the first and second electrodes and the antenna are provided within a casing. The casing may comprise a length or loop of material. The casing may be incorporated in, mounted on or attached to an item, such as a life jacket.

The antenna may comprise the first and/or second electrode.

According to a second aspect of the invention we provide an emitter comprising a power source, light emitting means and radio wave emitting means, the light emitting means comprising a first and second electrode, a dielectric material and an electroluminescent material being provided between the first and second electrodes, the radio wave emitting means comprising an antenna, the antenna comprising the first and/or second electrode.

The first and second aspects of the invention may include one or more of the following features or possibilities, independently of one another.

The emitter may be provided as a discrete item or may be incorporated in or on a further item.

The emitter may be mounted on or in or be provided integrally with another item, such as a life jacket.

The emitter may comprise a loop providing the light emitting means and the antenna, the loop being connected to a unit, the unit providing the power source. The unit may further comprise a part of the radio wave emitting means and/or control means.

The power source is preferably a DC source. The source may be a battery. One or more batteries may be provided. The batteries may be of the alkaline and/or lithium type. The power source may be provided together with an inverter or power convertor. The power source may be converted to give between 20 and 400V, more preferably between 70 and 220V. The power source may be converted to give a frequency of between 50 Hz and 2750 Hz and more preferably of between 70 Hz and 2500 Hz.

Preferably a single power source is used for the light emitting means and the radio wave emitting means.

The power source may be controlled by control means. The control means may complete or break the electrical circuit. The control means may close the electrical circuit to give light emission and/or radio wave emission.

The control means may include a manually operated on and/or off and/or on and off switch. The control means may include an automatic on control. The automatic on control may be activated where predetermined conditions are met. The predetermined conditions may be or include emersion of the emitter or part thereof in water, for instance for a predetermined period. The predetermined period may be greater than 5 seconds, greater than 10 seconds or even greater than 20 seconds.

The control means may include selection means for continuous and/or intermittent (flashing) light emission and/or radio wave emission. The light emission may flash at between 20 and 80 flashes per minute.

The control means may include radio wave frequency selection means.

The first electrode may be formed of metal. The first electrode may form a core to the light emitting means and preferably to the radio wave emitting means too.

The second electrode may be provided around the first electrode. The second electrode may be provided about the axis of the first electrode, for instance concentrically there about. The second electrode may allow the passage of visible light through it. The second electrode may be discontinuously provided about the first electrode.

The second electrode may be provided by one or more braided electrical conductors. The braids may define apertures there between to allow the passage of visible light.

The dielectric material may be provided as a layer between the first and second electrodes. The dielectric material may be provided as a sleeve. The dielectric material may be provided around the first electrode. The second electrode may be provided around the dielectric material. The dielectric material may be provided as a concentric sleeve on the first electrode.

The electroluminescent material may be provided as particulate material within the dielectric material. The electroluminescent particles may be homogeneously provided within the dielectric material.

The electroluminescent material may be phosphor.

The light emitted is preferably coherent. The light may have a wavelength of between 480 and 530 nm and more preferably of between 500 and 510 nm.

An outer cover may be provided over the second electrode. The outer cover is at least partially transparent to visible light and may be transparent throughout its extent. The outer cover is preferably waterproof.

The combined light emitting means and antenna may be provided in the form of a strand, fibre or cord. The combined light emitting means and antenna may be flexible. The strand, fibre or cord may have a diameter of between 0.1 mm and 10 mm and more preferably a diameter of between 0.3 mm and 3 mm. The bending diameter may be less than 20 times, more preferably less than 10 times and ideally less than 7 times the diameter of the strand, fibre or cord.

The radio wave emitting means may include a radio frequency transmitter. The radio frequency transmitter may provide between 2 mW and 250 mW into the antenna and more preferably between 20 mW and 150 mW. The radio wave emitter means may transmit at 121.5 MHz and/or 243 MHz. One or more further emission frequencies may be provided.

The antenna may include both first and second electrodes. The antenna may be a looped antenna.

According to a third aspect of the invention we provide an item incorporating and/or provided with an emitter according to the first and/or second aspect of the invention.

The item may be an item of clothing, such as a survival suit, waterproof suit, wet suit, dry suit, diving suit, a coat, a waterproof coat or harness.

The item may be a buoyancy item or aid such as a life jacket, life raft, lifeboat, floatation aid or life belt.

BRIEF DESCRIPTION OF THE DRAWINGS

Various embodiments of the invention will now be described, by way of example only, and with reference to the accompanying drawings in which:

FIG. 1 illustrates a perspective view in partial cross section of a component of the invention;

FIG. 2 illustrates schematically the circuitry of an embodiment of the present invention; and FIG. 3 illustrates an embodiment of the invention in use.

DETAILED DESCRIPTION OF THE PREFERRED EMBODIMENTS

In a wide variety of situations, but particularly in search and rescue applications, it is desirable for a person to be able to indicate their position to remote locations. In the case of a search and rescue scenario, this enables the searchers to detect and locate the person and to provide rescue means at the relevant location to save that person.

To indicate their location it is necessary for the person to have some form of emitter in their possession. In the case of a person who becomes separated from the vessel on which they are travelling, for instance by being washed overboard, in the case of a person who becomes separated from the vessel because that vessel sinks and in the case where that person or persons are present in a life raft or life boat, it is desirable for the emitter to be readily portable. It is not practical for normal forms of emitter, such as radios, to be provided and/or conveyed to the remote location in emergency situations.

The present invention, in one embodiment, and as illustrated in FIG. 1 includes an emitter in the form of a flexible strand 1. The strand 1 comprises a central solid core 3 of electrically conducting material provided within a sleeve 5 of dielectric material which incorporates electroluminescent particles. The dielectric sleeve 5 is itself enclosed within an electrode 7 formed of braided electrical conductors 9 which define apertures 11 through which the dielectric layer 5 underneath is exposed. The outer electrode 7 is itself enclosed within a watertight insulating sleeve 13. By providing a transparent sleeve 13 a significant portion of the dielectric material 5 is externally visible.

The overall circuit structure of the device is illustrated in one embodiment in FIG. 2. In this case the light emitting means 20, incorporating the antenna, is connected to a power source 22. The circuit between the core electrode and the outer electrode in the light emitting means is completed by the dielectric material 5 provided between the inner 3 and outer 7 electrodes.

As well as a power source 22, the circuit includes an inverter 24 to generate an AC voltage in the circuit. A voltage of 80 to 120 volts with a frequency of between 800 Hz and 2500 Hz is generally employed.

In combination with control means 26 this circuit when activated generates a significant light output. When an AC voltage is applied between the electrodes 3 and 7 and hence across the dielectric material 5 the electroluminescent particles within the dielectric material emit light in response to that electric field. Phosphor particles are suitable for this application.

Light generated within the dielectric material 5 is emitted through the apertures 11 in the outer electrode 7 and through the transparent outer cover 13 into the surrounding environment.

The flexible strand is generally provided at between 0.5 mm and 2.5 mm in diameter.

As the light generated by the electroluminescent particles is coherent, containing only those frequencies of the visible spectrum applicable to the colour in use, the light is very bright and penetrating. The light generated is highly visible even in smoky, foggy, or other reduced visibility conditions in which incandescent light, due to its complex components, is refracted and poorly visible as a result.

The emission of highly visible light in this way enables the precise position of the emitter to be indicated to detectors, such as a search party, at short and moderate range.

To assist in long range locating of the emitter, the circuit also incorporates a radio frequency transmitter 28 which employs one or both of the electrodes 3 and 7 as its antenna to emit a homing signal.

Under the operating conditions indicated above the transmitter provides between 25 mW and 125 mW into the antenna. The transmitter 28 can readily be provided so as to emit one or more distinctive frequencies, VHF and/or UHF, for instance the international distress and homing frequency of 121.5/243 MHz. By providing a loop antenna 360° tracking is provided.

Using a conventional PP3 battery as the power source, it is possible to provide an emitter having light emitting properties in flashing mode for approximately 24 hours and in constant mode for over 6 hours, as well as radio transmission of between 12 and 24 hours. Such a system operates successfully at between −10° C. and +55° C.

The length of the light emitting ariel portion can be varied as desired. Additionally due to its flexible nature it can be bent or coiled during use and/or during storage.

In an alternative form of the invention, not shown, the emitter may take the form of a flexible strand containing a core of electrically conducting material provided with a sleeve of dielectric material and incorporating electroluminescent particles. The dielectric sleeve is enclosed within an electrode of a braided form so as to allow light to pass out through the electrode. By applying power to the electrodes, light is generated. Additionally, as part of the strand, an antenna for the radiowave emitting means is also provided. This antenna may be provided outside the transparent sleeve for the light emitting means or provided within that sleeve. The antenna may be provided parallel to the light emitting components in such a system.

The functions and complexity of the control unit 24 for the device can be varied significantly.

In one embodiment the control circuit may provide an on and off control for the emitter. The control may also incorporate automatic activation should the unit be submersed in water for a predetermined period, for instance 20 to 30 seconds, as well as or instead of the manual control.

The control means 26 may also include an indicator showing whether the power source 22 is functional or not and/or continuous or flashing mode selection for the light source and/or frequency selection for the RF transmitter 28. Frequency selection, for instance, allows a test frequency to be selected for testing the device and/or for practising emergency drills without alerting the authorities through use of the international distress and homing frequency.

A device according to the present invention can be provided on the person and/or in proximity thereto in a wide variety of ways. For instance, as illustrated in FIG. 3 the device 30 can be worn by the user 32 integrally provided as a loop 34 about the neck of the user 32 on the front of a life jacket 36. The packet 38 containing the power source and other components is provided on the front of the life jacket 36.

The system can also be provided as an integral component of a life raft, mounted on a life boat, worn as a cord around the neck of the user (mariners, aviators, or remote travelers) or in a wide variety of other applications. The emitter can be used in emergency situations or routinely to indicate the user's position.

The construction of the emitter and its manner of the operation make it resistant to impact, vibration or shock, and also enable it to function in water for extended periods. It is also suitable for use in hazardous atmospheres, such as those in which there is a risk of explosion.

What is claimed is:

1. A position indicating emitter, comprising:
   a power source;
   a light emitter that is coupled to said power source and that has a first electrode, a second electrode, and an electroluminescent material that is positioned substantially between said first electrode and said second electrode, wherein said first electrode, said second electrode, and said electroluminescent material are contained in a casing; and
   a radio emitter that is coupled to said power source and that uses said light emitter as an antenna.

2. The position indicating emitter of claim 1, wherein said casing is provided in a substantially looped form.

3. The position indicating emitter of claim 1, wherein said radio emitter transmits through at least one of said first electrode and said second electrode.

4. The position indicating emitter of claim 1, wherein said second electrode is provided concentrically around said first electrode.

5. The position indicating emitter of claim 4, wherein said second electrode permits passage of visible light from said electroluminescent material to a surrounding environment.

6. The position indicating emitter of claim 5, wherein said second electrode is formed from braided wire.

7. The position indicating emitter of claim 1, wherein said power source comprises an inverter that produces AC voltage.

8. The position indicating emitter of claim 1 further comprising an item that may be worn by a user and that has an opening through which a body part of said user may pass, wherein a substantially looped form of said casing substantially encircles said opening.

9. The position indicating emitter of claim 8, wherein said opening of said item is intended to pass a neck of said user.

10. The position indicating emitter of claim 8, wherein said item is a floatation aid.

11. The position indicating emitter of claim 8, wherein said item is an article of clothing.

12. The position indicating emitter of claim 1, wherein a substantially looped form of said casing allows the position indicating emitter to be worn about a user's neck.

13. The position indicating emitter of claim 1, wherein said electroluminescent material comprises phosphor.

14. The position indicating emitter of claim 1, wherein said casing is at least partially transparent.

15. The position indicating emitter of claim 1, wherein said radio emitter continuously radiates a radio signal.

16. The position indicating emitter of claim 1, wherein said radio emitter intermittently radiates a radio signal.

17. The position indicating emitter of claim 1, wherein said light emitter continuously radiates light.

18. The position indicating emitter of claim 1, wherein said light emitter intermittently radiates light.

* * * * *